(12) United States Patent
Nefedov

(10) Patent No.: US 7,039,024 B2
(45) Date of Patent: May 2, 2006

(54) METHOD AND ARRANGEMENT FOR MULTIPLEXING SEVERAL USERS TO THE COMMUNICATION CHANNELS OF A TDMA SYSTEM

(75) Inventor: Nikolai Nefedov, Espoo (FI)

(73) Assignee: Nokia Mobile Phones, Ltd., Espoo (FI)

( * ) Notice: Subject to any disclaimer, the term of this patent is extended or adjusted under 35 U.S.C. 154(b) by 833 days.

(21) Appl. No.: 09/735,149

(22) Filed: Dec. 12, 2000

(65) Prior Publication Data

US 2001/0004359 A1    Jun. 21, 2001

(30) Foreign Application Priority Data

Dec. 15, 1999    (FI) .................................. 19992692

(51) Int. Cl.
*H04Q 7/00*    (2006.01)

(52) U.S. Cl. ........................ 370/314; 370/347; 370/535

(58) Field of Classification Search ................ 370/314, 370/321, 337, 347, 535–538
See application file for complete search history.

(56) References Cited

U.S. PATENT DOCUMENTS

| | | | | |
|---|---|---|---|---|
| 4,852,090 A | * | 7/1989 | Borth | 370/347 |
| 5,062,105 A | * | 10/1991 | McKnight et al. | 370/538 |
| 5,193,091 A | * | 3/1993 | Crisler et al. | 370/336 |
| 5,594,738 A | * | 1/1997 | Crisler et al. | 370/347 |
| 5,640,395 A | * | 6/1997 | Hamalainen et al. | 370/322 |
| 5,875,182 A | * | 2/1999 | Hatzipapafotiou | 370/321 |
| 5,933,768 A | * | 8/1999 | Skold et al. | 455/296 |
| 5,938,787 A | * | 8/1999 | Stark | 714/755 |
| 6,081,514 A | * | 6/2000 | Raith | 370/321 |
| 6,160,800 A | * | 12/2000 | Atsuta | 370/337 |

(Continued)

FOREIGN PATENT DOCUMENTS

EP    0564339    10/1993

(Continued)

OTHER PUBLICATIONS

"Co-channel Interference Cancelling Receiver for TDMA Mobile Systems", Ranta et al., Proc. ICC'95, pp. 17–21, 1995.

*Primary Examiner*—Chi Pham
*Assistant Examiner*—Blanche Wong
(74) *Attorney, Agent, or Firm*—Perman & Green, LLP

(57) ABSTRACT

A method and associated hardware are disclosed for multiplexing communication connections in a telecommunication system based on time division multiple access. There is defined a burst structure that consists of symbols and fills a time slot at a radio interface. The burst structure is filled with symbols, thus composing a transmission burst, which is transmitted within a time slot. The step of filling the burst structure with symbols comprises the substeps of taking information symbols of a first kind and filling a first part (302, 802, DATA) of the burst therewith, and taking information symbols of a second kind and filling a second part (306, 816, DATA) of the burst therewith. Additionally there is taken control symbols which are used to fill certain control parts (301, 303, 304, 305, 307, 601, 602, 603, 801, 803, 804, 805, 807, 811, 813, 814, 815, 817, 1011, 1012, 1013 S) of the burst.

26 Claims, 7 Drawing Sheets

U.S. PATENT DOCUMENTS

| | | |
|---|---|---|
| 6,208,654 B1 * | 3/2001 | Moteki et al. ............ 370/395.2 |
| 6,411,613 B1 * | 6/2002 | Seymour et al. ............ 370/347 |
| 6,466,568 B1 * | 10/2002 | Raith et al. ................. 370/347 |
| 6,501,745 B1 * | 12/2002 | Turina et al. ................ 370/337 |
| 6,539,010 B1 * | 3/2003 | Hagerman et al. .......... 370/347 |
| 6,608,821 B1 * | 8/2003 | Gendel ....................... 370/280 |
| 6,628,945 B1 * | 9/2003 | Koorapaty et al. ......... 455/434 |
| 6,654,921 B1 * | 11/2003 | Jones et al. ................ 714/746 |
| 6,707,807 B1 * | 3/2004 | Menzel ....................... 370/337 |
| 2003/0185181 A1 * | 10/2003 | Balachandran et al. ..... 370/337 |

FOREIGN PATENT DOCUMENTS

| | | |
|---|---|---|
| EP | 0980153 | 2/2000 |
| EP | 1059740 A1 | 12/2000 |
| EP | 1069711 | 1/2001 |
| WO | WO 99/59269 | 11/1999 |

* cited by examiner

METHOD AND ARRANGEMENT FOR MULTIPLEXING SEVERAL USERS TO THE COMMUNICATION CHANNELS OF A TDMA SYSTEM

TECHNOLOGICAL FIELD

The invention concerns generally the technology of distributing the time and frequency resources of a radio communication system among the users of the system. Especially the invention concerns the technology of using the time slots defined in a time division multiple access system effectively in a situation where users may have mutually different and/or dynamically changing needs for data rates over the radio interface.

BACKGROUND OF THE INVENTION

In TDMA-based cellular radio systems a base station allocates cyclically occurring time slots from certain transmission frames to the use of portable terminals. We will discuss the known GSM (Global System for Mobile telecommunications) and its further developed version EDGE (Enhanced Datarates for GSM Evolution) as examples.

As a background for the invention, the known GSM transmission chain will be briefly discussed with reference to FIG. 1. The transmission of full-rate speech is used here as an example of a typical service requiring a circuit-switched connection. Speech recorded by a microphone 101 will first be encoded in a speech encoder 102 which converts an analogue speech signal into digital form and performs a group of encoding operations. The output signal of the speech encoder has a rate of 13 kbit/s and consists of blocks of 260 bits, the blocks following each other at an interval of 20 ms. The channel encoder 103 introduces redundancy into this data flow, increasing its rate by adding into it information calculated from the contents of the blocks. The reason for channel coding is to allow the detection or even the correction of signal errors introduced later during transmission. The output of the channel encoder 103 consists of code words of 456 bits each. Exactly one code word is produced from each block of input information for the channel encoder.

The code words that come from the channel encoder 103 are input to the interleaver/burst formatter 104 for mixing up the bits of several code words in a predetermined fashion and organising them into bursts. The aim of interleaving is to decorrelate errors that will potentially occur in the transmission so that the resulting erraneous bits will be distributed into essentially randomised positions in several code words instead of corrupting a sequence of successive bits in a single code word. Most interleaving methods that are currently used are diagonal, meaning that bits from consecutive code words are cross-distributed so that certain bits of the later codeword come earlier in the interleaved data stream than certain other bits of the former codeword. In the GSM arrangement, the bits from a certain full-rate speech channel code word are spread over a period of 8 bursts so that 57 bits from the code word go into each burst. Also other interleaving schemes are used in GSM depending on the nature of the information to be interleaved (speech, data, access request etc.).

Remaining within our full-rate speech example, the burst formation part of the interleaver/burst formatter 104 inserts 57 bits from a certain B:th code word into the odd-numbered bit positions of a burst and 57 bits from the (B+1):th code word into the even-numbered bit positions of the burst. It adds 2 so-called stealing flag bits to get an entity of 116 interleaved bits. Additionally it adds three zero bits (called the tail bits) at the beginning and end thereof as well as a so-called training sequence of 26 bits exactly in the middle. At the output of the interleaver/burst formatter 104 the flow of information consists therefore of bursts of 148 bits altogether. For the description to be consistent throughout this patent application, the bits of a GSM burst will be called symbols in the following. Additionally the burst will be denominated as a digital burst while it is still in digital form.

The ciphering block 105 performs a logical exclusive-or operation between the coded data symbols of a digital burst and a certain pseudo-random bit sequence in order to impede the unauthorised reception of the transmitted data. The tail symbols, the stealing flag symbols and the training sequence are not ciphered. After ciphering the digital bursts are input into a modulator/upconverter 106 that transforms each digital burst into a sequence of a radio-frequency analogue oscillating signal, which is amplified in an amplifier 107 and conducted into an antenna 108 for transmission. Because of its close connection with the digital burst, the analogue signal sequence is also known as a burst; for clarity it can be further specified as a transmission burst. Several filtering operations take place inside the modulator/upconverter 106 and between it and the antenna 108; for graphical clarity the respective filter blocks are omitted from FIG. 1. In the TDMA scheme of GSM each speech channel may use a single time slot in a cyclically repeated frame of eight consecutive time slots. The transmitter transmits one transmission burst in an allocated time slot of each consecutive frame during the active connection.

A receiver chain for receiving, demodulating and decoding the data transmitted by the transmission chain of FIG. 1 would consist of a receiving antenna for receiving the radio signal, some filters and amplifiers for filtering and amplifying the received signal, a downconverter/demodulator or an equalizer for converting the transmission burst into digital form on baseband frequency, a deciphering block for converting the ciphered bits into plain data, a burst deconstructing/de-interleaving block for exctracting the data bits and removing the interleaving, a channel decoder for removing the channel coding, and a speech decoder/D/A converter for converting the decoded digital signal into an analogue signal from which the original speech may be reproduced by a loudspeaker. The operation of the blocks in the receiver chain is approximately the inverse of that of the respective blocks in the transmitter chain.

Minor changes are required in the above-explained functions of the transmission and reception chain blocks for other transmission modes than full-rate speech. These changes are known to the person skilled in the art from the GSM specifications published by ETSI (European Telecommunications Standards Institute) and e.g. from the book Michel Mouly, Marie-Bernadette Pautet: "The GSM System for Mobile Communications", published by the authors, ISBN 2-9507190-0-7, Palaiseau 1992.

The transmission chain of FIG. 1 is basically applicable also for EDGE transmissions, although the use of higher data rates would necessitate changes in the function of the blocks. Data requiring a higher data rate would most probably originate from a different source than a microphone and a speech encoder, for example a camera and a video encoder. The channel encoder block would operate according to the EDGE channel encoding scheme and, together with the interleaver/burst formatter, ciphering block and the modulator part of the modulator/upconverter, it would have to operate much faster than in basic GSM. The channel encoder block would also be capable of changing the amount of applied channel encoding according to link adaptation commands.

The most radical difference would result from the different modulation method. In the 8 PSK modulation scheme of EDGE, three consecutive bits in the formatted digital burst are mapped onto one transmission symbol. For this reason already a symbol in the digital burst is said to consist of a group of three consecutive bits instead of one bit as in GSM. During the transmission of a burst, the transmitter will produce transmission symbols with the instantaneous rate of 270 ksymbols/s, which is the same as in GSM; the difference in performance results from the fact that an 8 PSK symbol carries the information equivalent to three bits, whereas in GMSK each symbol only corresponds to one bit.

If the propagations conditions on a radio channel are good, it is possible to multiplex two simultaneous connections between the base station and GSM or EDGE terminals so that each connection is only allowed to use the allocated slot in every second frame. This arrangement is known as the allocation of a half-rate traffic channel. The general burst structure to be transmitted in an allocated time slot remains the same, but the generation of data to be transmitted, the channel coding and the interleaving/burst formatting schemes have to be adapted accordingly. The same approach can be extended to quarter-rate traffic channels, where a certain connection is only allowed to use the allocated time slot in every fourth frame, and even to eighth- or octave-rate traffic channels, where a certain connection is only allowed to use the allocated time slot in every eighth frame.

The drawback of the known multiplexing methods is that they tend to decrease the effective interleaving depth. A full-rate traffic channel has an effective interleaving depth of eigth frames, a half-rate traffic channel has an effective interleaving depth of four frames, and so on until the eighth- or octave-rate traffic channel has an effective interleaving depth of only one frame. Reducing the interleaving depth is synonymous to increasing sensitivity to propagation errors, so in order to achieve a certain QoS or Quality of Service the signal to noise (S/N) ratio or carrier to interference (C/I) ratio associated with the connection should increase correspondingly. This not a feasible assumption, because simulation has shown that for example an octave-rate traffic channel would require a C/I ratio of over 30 dB. The severity of the problem is underlined by the fact that every one of the multiplexed connections should simultaneously experience the same excellent propagation conditions, which is not probable since the locations of the users within the cell may vary considerably.

A straightforward solution for providing more robustness against propagation errors on the reduced-rate traffic channels would be to extend the interleaving scheme depending on the channel rate so that the bits of a certain code word would be spread over a larger number of bursts. However, this leads to unacceptably long delays in the interleaving and deinterleaving stages.

From the applicant's U.S. patent applications Ser. Nos. 60/144,307, 60/144,491 and 60/144,723, which are not publicly known at the priority date of the present patent application, there is known a method and an arrangement where the known burst structure is radically changed so that a single time slot actually comes to house two different, temporally consecutive bursts separated from each other by a guard period. This solution relieves the requirements for excessively good carrier to interference ratio, but it has the drawback of necessitating the specification and implementation of a completely new burst structure, which makes it unattractive to the designers of transceiver equipment.

SUMMARY OF THE INVENTION

It is an object of the present invention to provide a method and an arrangement for multiplexing several connections to the time slots of a TDMA system without placing exaggerated requirements to the carrier to interference ratio. It is an additional object of the invention to provide such a method and arrangement which would allow for flexibility in the number of multiplexed connections.

The objects of the invention are achieved by allowing two simultaneous connections to use a same time slot, and by using coding and decoding arrangements to separate the transmissions related to the different connections.

The transmission method according to the invention comprises the steps of
   defining a burst structure that consists of symbols and fills a time slot at a radio interface,
   filling the burst structure with symbols, thus composing a transmission burst, and
   transmitting the transmission burst within a single time slot;
   it is characterized in that the step of filling the burst structure with symbols comprises the substeps of
   taking information symbols of a first kind and filling a first part of the burst therewith,
   taking information symbols of a second kind and filling a second part of the burst therewith and
   taking control symbols and filling the rest of the burst therewith.

The reception method according to the invention is characterized in that it comprises the steps of
   extracting from a first part of a signal received during a time slot a number of information symbols of a first kind
   extracting from a second part of said signal received during a time slot a number of information symbols of a second kind
   attempting the decoding of said information symbols of a first kind,
   attempting the decoding of said information symbols of a second kind and
   accepting as received those information symbols the decoding of which proved to be successful.

The invention also applies to a transmitter arrangement for maintaining multiplexed communication connections in a telecommunication system based on time division multiple access, comprising a burst formatter arranged to compose a transmission burst that consists of symbols and fills a time slot at a radio interface. It is characterized in that it comprises means for providing the burst formatter with information symbols of a first kind and information symbols of a second kind, so that the burst formatter is arranged to fill a first part of a transmission burst with said information symbols of a first kind, a second part of the transmission burst with said information symbols of a second kind and the rest of the transmission burst with control symbols.

Additionally the invention applies to a receiver arrangement which comprises a burst decomposer arranged to decompose a transmission burst that consists of symbols and fills a time slot at a radio interface into sequences of information symbols; it is characterized in that it comprises means for separatedly attempting the decoding of different sequences of information symbols extracted from a transmission burst by said burst decomposer, and means for accepting as received those information symbols the decoding of which proved to be successful.

The general idea of using some kind of coding and decoding arrangements to separate between two simultanous radio transmissions is known e.g. from the field of spread spectrum communications, where each individual transmission is spread with a code taken from a family of orthogonal or nearly orthogonal spreading codes. A receiver which knows the inverse of the code of its intended reception signal performs a despreading operation where the orthogonal or nearly orthogonal nature of the spreading codes serves to cancel the effect of the other simultaneous, unwanted signals. However, the application of spread spectrum technologies necessitates a relatively complicated architecture for the transmitter and receiver devices.

According to the present invention, a receiver may well receive even some of the contents of an unwanted transmission, if a digital ciphering arrangement is used to ensure that a certain receiver can decode (and decipher) only those parts of the received signal which carry information that is intended for the reception of that receiver.

According to a so-called downlink embodiment of the invention a digital burst is formatted according to a burst formatting scheme which may well be generally the same which is applied in some other, previously known communication system, but where the symbols or data bits that are the constituents of the digital burst come from at least two differently encoded (or ciphered, or scrambled) sources. A receiver receiving such a burst uses the received data bits to construct a number of code words according to a certain deinterleaving scheme. The receiver will only be able to successfully decode (or decipher, or descramble) those code words which were encoded (or ciphered, or scrambled) in the transmitter with the code associated with that particular receiver.

According to a so-called uplink embodiment of the invention different transmitters may transmit simultaneously so that only a part of the payload portion in the transmission burst transmitted by each transmitter consists of actual data while other parts of the payload portion are empty. The partitioning of payload portions is coordinated between the transmitters so that in the time domain, only one transmitter at a time transmits actual data. The transmitters use their own training sequences within the transmission burst so that a receiver may use the training sequences to separately produce a channel estimate for each propagation channel between a transmitter and itself. The training sequences from different transmitters may be temporally simultaneous, whereby the receiver uses a technique known as joint channel estimation for differentiating between training sequences from different transmitters.

Flexibility may be added to the method and arrangement by introducing new traffic channel coding schemes that reduce the gaps between the known full rate, half rate, quarter rate and octave rate schemes. These coding schemes, combined with the burst formatting embodiments described above, give a wide variety of different multiplexing configurations to choose from.

BRIEF DESCRIPTION OF DRAWINGS

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

FIG. 1 was described already in the description of prior art.

DETAILED DESCRIPTION OF THE INVENTION

Figure 1:
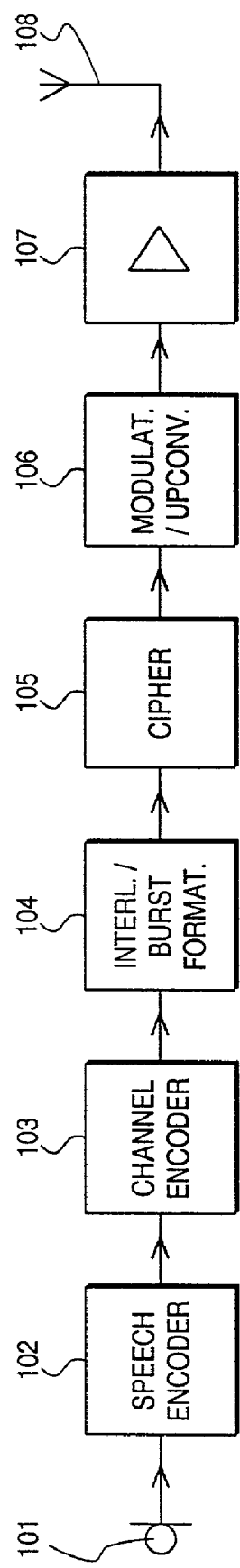
FIG. 1 illustrates a known transmission chain in a transmitter.
Figure 2:
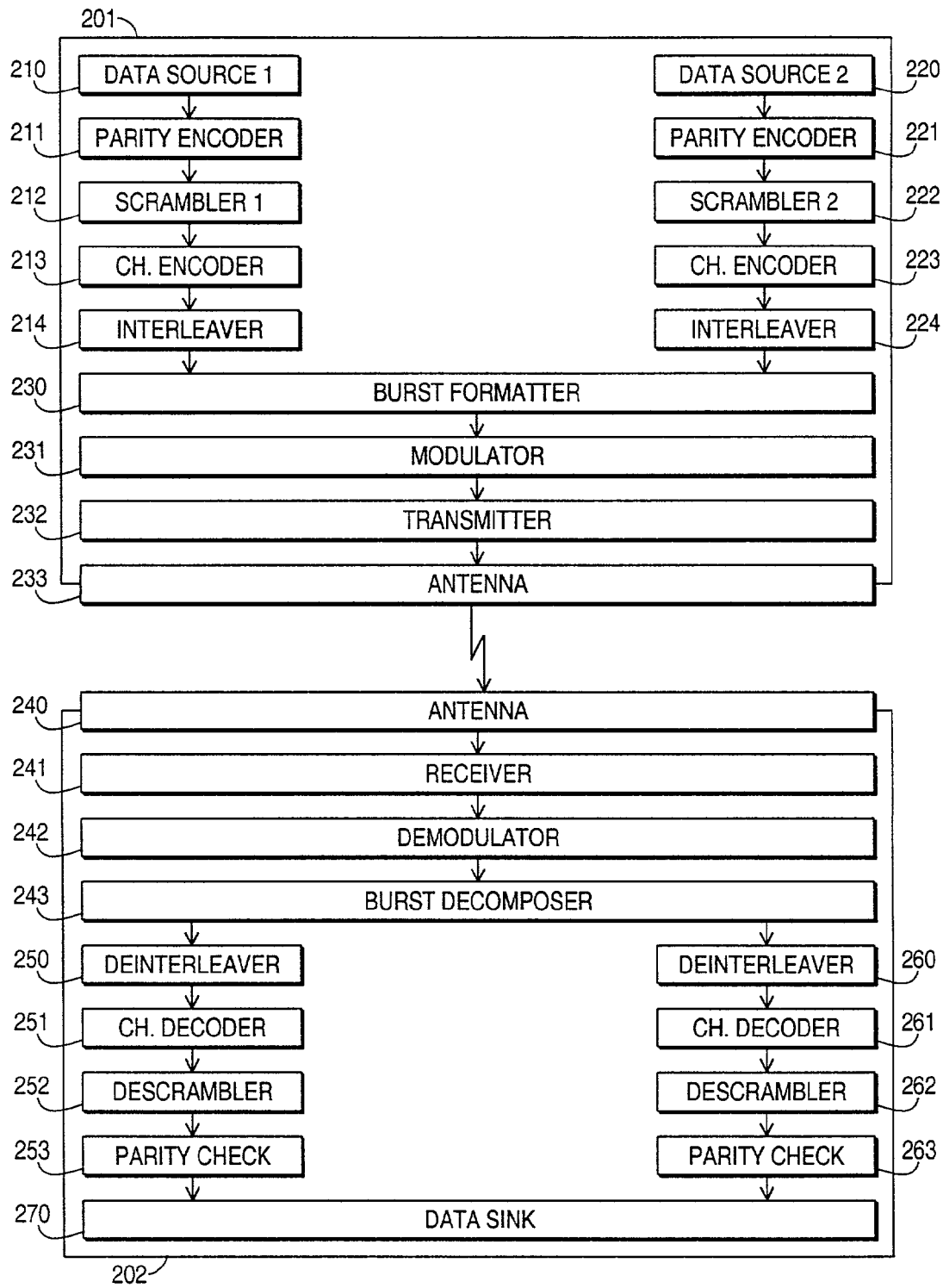
FIG. 2 illustrates the structure and functional principle of an arrangement according to a first embodiment of the invention.

FIG. 2 illustrates an arrangement where a base station subsystem 201 (or generally: a transmitting arrangement) is in a communication connection with a mobile terminal 202 (or generally: a receiving arrangement). The base station subsystem comprises a first transmission subchain that is a serial connection of a first data source 210, a first parity encoding unit 211, a first scrambling or ciphering unit 212, a first channel encoder 213 and a first interleaver 214. In parallel therewith the base station comprises a second transmission subchain that is a serial connection of a second data source 220, a second parity encoding unit 221, a second scrambling or ciphering unit 222, a second channel encoder 223 and a second interleaver 224. The outputs of both interleavers 214 and 224 are coupled to a burst formatting unit 230 from the output of which there is a serial connection of a modulator 231 and a transmitter 232 to a transmitting antenna 233.

The mobile terminal 202 comprises a receiving antenna 240 and coupled thereto a serial connection of a receiver 241, a demodulator 242 and a burst decomposer 243. The output of the burst decomposer 243 is conceptually coupled to a first reception subchain and a second reception subchain, although in practice there may be only one reception chain hardware the operation of which is time divided. The first reception subchain consists of a serial connection of first deinterleaver 250, a first channel decoder 251, a first descrambling unit 252 and a first parity checking unit 253. The second reception subchain consists of a serial connection of first deinterleaver 260, a second channel decoder 261, a second descrambling unit 261 and a second parity checking unit 263. The outputs of both parity checking units 253 and 263 are coupled to a data sinking block 270.

The arrangement of FIG. 2 operates as follows. The data sources 210 and 220 both produce data which is meant to be transmitted to the mobile station 202. Typical data sources in a base station subsystem are logical couplings to a public land mobile network from which there comes e.g. digitally encoded speech to be transmitted to the mobile terminal. The data consists of bits and is arranged into certain discrete units which we may call data blocks. The first parity encoding unit 211 calculates a parity code for each block of digital data coming from the first data source 210 and adds the parity code to the the data block. The parity encoded data block is then scrambled (or ciphered) in the first scrambling or ciphering unit 212 using a first scrambling or ciphering code. In the following we will only refer to scrambling for brevity. The parity encoded and scrambled data block is channel encoded in the first channel encoder 213, mapping the bits into symbols and producing code words, and the symbols from several consecutive code words are interleaved in the first interleaver 214. In the second transmission subchain similar operations are performed to data blocks originating from the second data source 220 with the difference that the second scrambling or ciphering unit 222 uses a different code for scrambling the data.

Figure 3:
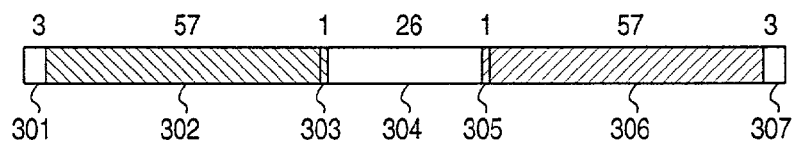
FIG. 3 illustrates an exemplary transmission burst in the arrangement of FIG. 2.

The burst formatting unit 230 takes interleaved symbols from both interleavers 214 and 224 as constituents for common digital bursts. In order to preserve compliance with known cellular radio systems, it is advantageous to use a known format for the digital bursts. FIG. 3 illustrates an exemplary digital burst which corresponds to the known GSM and EDGE specifications. The digital burst consists, in this order, of three front tail symbols 301, a first data field 302 with 57 data symbols, a first stealing flag symbol 303, a training sequence 304 with 26 training symbols, a second stealing flag symbol 305, a second data field 306 with 57 data symbols and three back tail symbols 307. The difference to the known GSM or EDGE arrangement is that the data symbols in the first data field 302 come from the output of the first interleaver 214 and the data symbols in the second data field 306 come from the output of the second interleaver 224. Also each of the stealing flag symbols is only associated with one data field. The association of certain fields with certain connections is emphasized by hatching. The modulator 231 converts the digital burst into a transmission burst according to known methods, and the transmitter 232 transmits it through the transmitting antenna 233.

When the mobile terminal 202 receives the transmission burst through the receiving antenna 240, it converts it to baseband symbols by using the receiver 241 and demodulator 242 according to known methods. The burst decomposer 243 directs the symbols to the deinterleavers 250 and 260 as it would do if the mobile terminal were just receiving normal transmission bursts. The data symbols from the first data field 302 go into the first deinterleaver 250 and the data symbols from the second data field 306 go to the second deinterleaver 260. The same procedure is repeated for every received transmission burst so that interleaved data symbols from the first data field of each transmission burst accumulate into the first deinterleaver 250 and interleaved data symbols from the second data field of each transmission burst accumulate into the second deinterleaver 260. The deinterleavers 250 and 260 invert the effect of interleaving, producing the original code words. The code words are channel decoded in the respective channel decoders 251 and 261, and the descrambling of the results is attempted in the descrambling units 252 and 262.

Now we may assume that the first data source 210 in the base station subsystem 201 produced data which was meant to be transmitted to the mobile terminal 202, while the second data source 220 in the base station subsystem 201 produced data which was meant to be transmitted to some other mobile terminal. The mobile terminal 202 is aware of the code used in the first scrambling or ciphering unit 212, because the code was agreed upon when the communication connection between the base station subsystem 201 and the mobile station 202 was set up. The mobile station is not aware of the code used in the second scrambling or ciphering unit 222. Therefore the descrambling operation in the first descrambling unit 252 succeeds, because the mobile terminal uses the correct descrambling code, but the descrambling operation in the second descrambling unit 262 fails, because the mobile terminal uses the wrong descrambling code. The success and failure of the descrambling operations in units 252 and 262 is noted in the parity checking units 253 and 263 respectively, because only the correctly descrambled data block corresponds correctly to its associated parity code. Only that data block for which the parity check provided a match is fed into the data sinking block 270.

As an alternative we may asssume that both data sources 210 and 220 in the base station subsystem 201 produced data which was meant to be transmitted to the mobile terminal 202, but channel allocation or some other circumstance caused two different scrambling codes to be used. If the corresponding two descrambling codes were both known to the mobile station, 202 it is able to set one of them to be used in the first descrambling unit 252 and the other in the second descrambling unit 262 so that descrambling in both unit succeeds and the data blocks for which the parity checks in blocks 253 and 263 provided a match are fed into the data sinking block 270.

Figure 4:
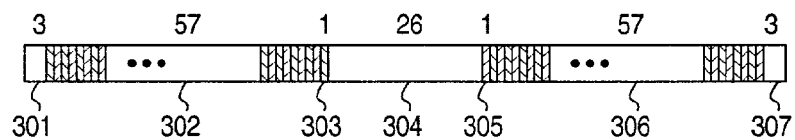
FIG. 4 illustrates an alternative transmission burst in the arrangement of FIG. 2.

The invention does not place any limitations to the method which is used to pack the symbols into bursts in the base station subsystem and correspondingly to decompose the bursts in the mobile terminal. FIG. 4 shows an alternative composition of a digital burst where in the data fields 302 and 306 the symbols associated with different connections alternate on symbol by symbol basis. The burst decomposer in the mobile terminal is responsible for assorting the symbols to correctly chosen deinterleavers.

Figure 6:
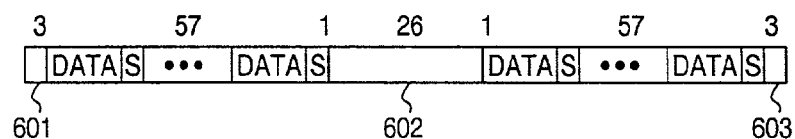
FIG. 6 illustrates an exemplary transmission burst in the arrangement of FIG. 5.
Figure 5:
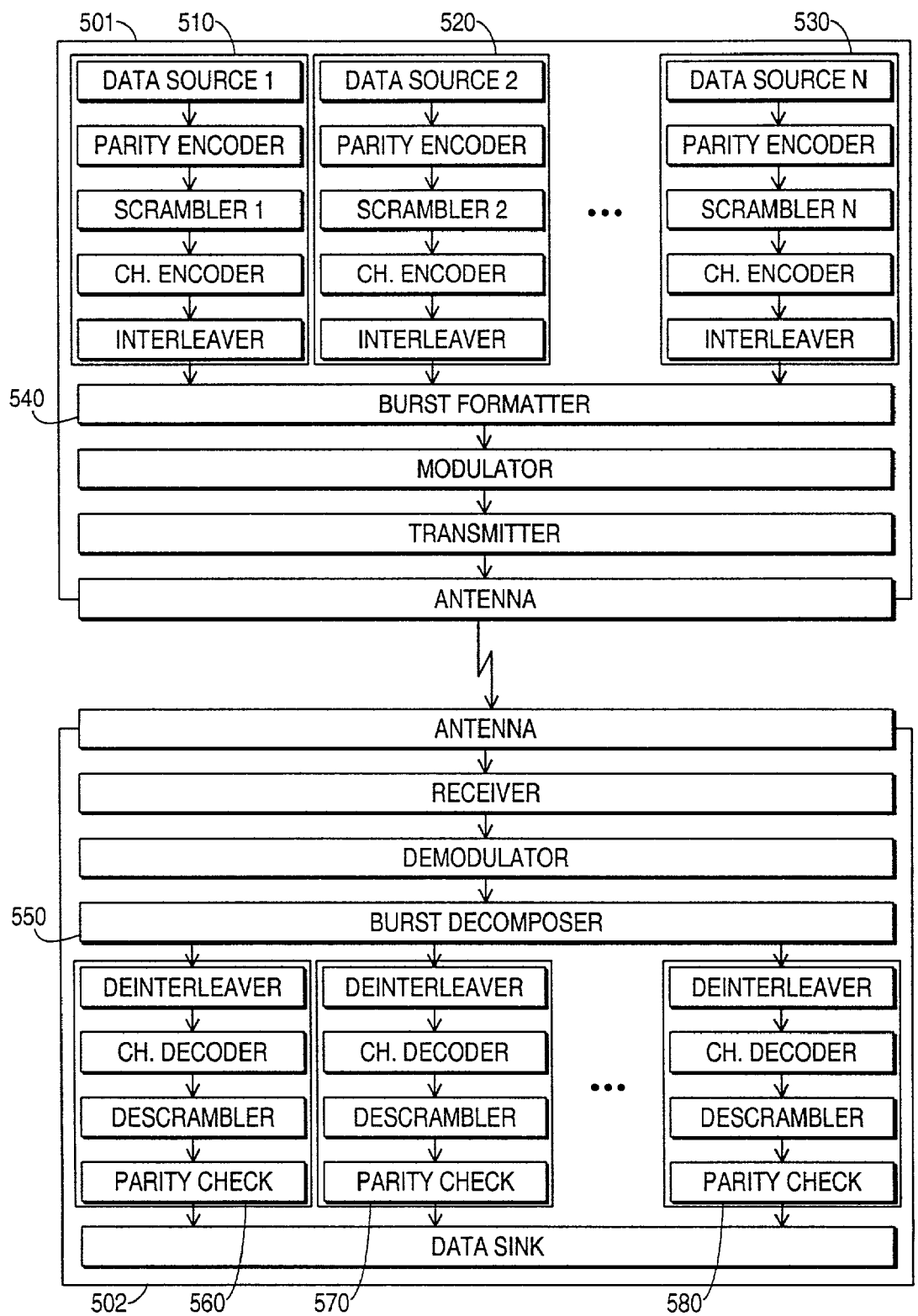
FIG. 5 illustrates a generalization of the arrangement of FIG. 2.

The arrangement of FIG. 2 is easily generalized to encompass an arbitrary number of multiplexed communication connections. FIG. 5 illustrates an arrangement where a base station subsystem 501 comprises a number of parallel transmission subchains, of which the transmission subchains 510 to 530 are shown. The burst formatter 540 takes symbols from the output of each transmission subchain when it composes the digital bursts to be transmitted. Conceptually the mobile terminal 502 comprises as many reception subchains coupled to the burst decomposing unit 550, of which the reception subchains 560 to 580 are shown. Again in practice many of the conceptually parallel units may find their implementation in the same hardware. FIG. 6 illustrates a burst structure where there are N/2 data fields between the front tail symbols 601 and the training sequence 602, and N/2 data fields between the training sequence 602 and the back tail symbols 603. Each data field is shown to have its own stealing flag symbol S. Here N is an even positive integer.

The advantage of the arrangements of FIGS. 2 and 5 over the prior art arrangements comes from the fact that each interleaving unit may be programmed to interleave the data symbols from a code word over the length of an arbitrary number of digital bursts. For example, the interleaving depth of eight frames may be maintained by interleaving the symbols from each code word over eight digital bursts. The interleaving and deinterleaving units must naturally share the knowledge of the interleaving scheme which is used.

Figure 7:
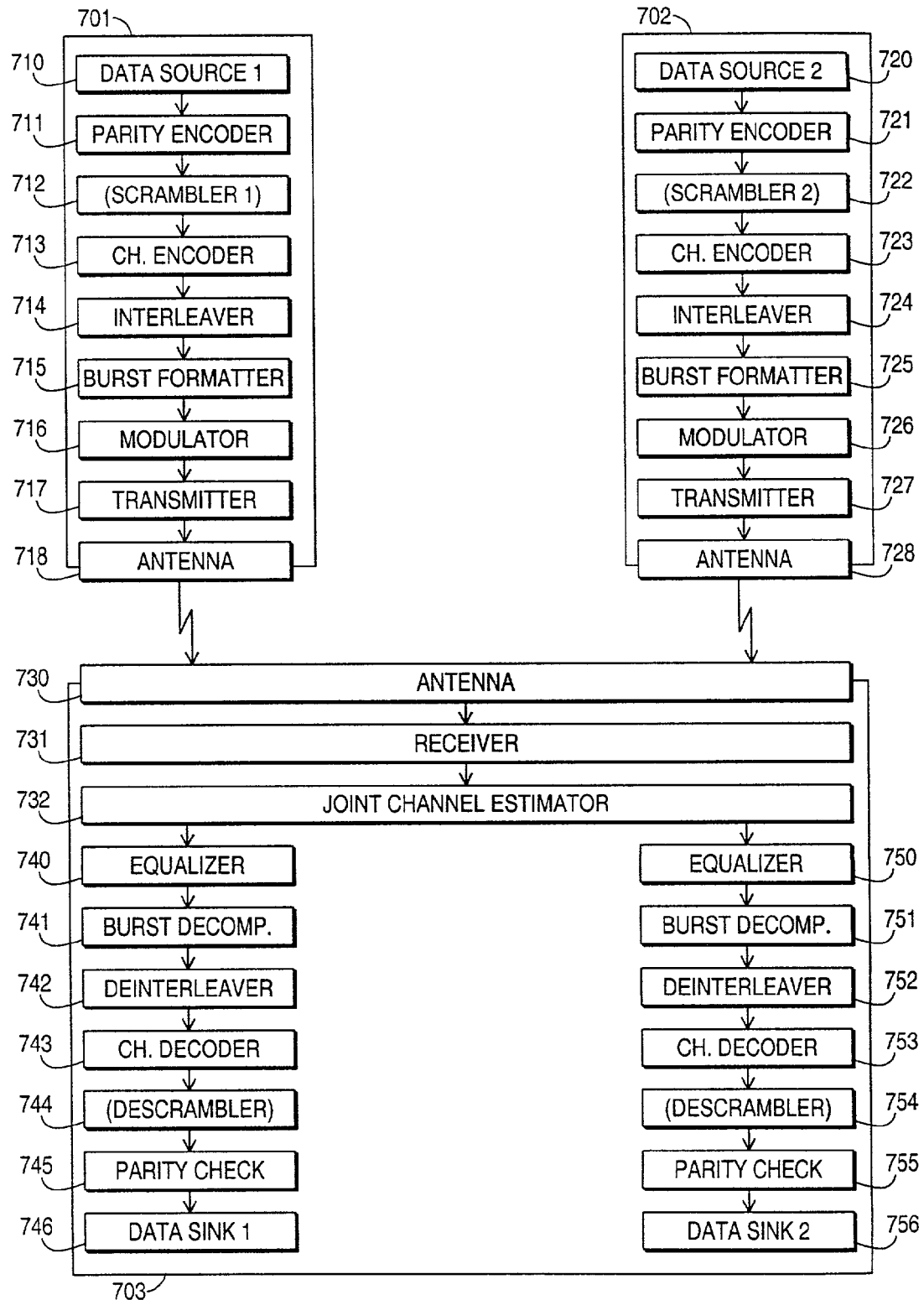
FIG. 7 illustrates the structure and functional principle of an arrangement according to a second embodiment of the invention.

Next we will explain the so-called uplink embodiment of the invention with reference to FIGS. 7 to 10. FIG. 7 illustrates a first mobile terminal 701 and a second mobile terminal 702 (or generally: first and second transmitting arrangements) which both have a communication connection to a base station subsystem 703 (or generally: a receiving arrangement). The transmission chain in both mobile terminals is a similar serial connection of a data source 710 (720), a parity encoding unit 711 (721), an optional scrambler 712 (722), a channel encoder 713 (723), an interleaver 714 (724), a burst formatter 715 (725), a modulator 716 (726), a transmitter 717 (727) and a transmitting antenna 718 (728). In the base station subsystem a receiving antenna 730 is coupled through a receiver 731 to a joint channel estimator 732, from which there are connections to two parallel reception subchains. Each reception subchain is a serial connection of an equalizer 740 (750), a burst decomposer 741 (751), a deinterleaver 742 (752), a channel decoder 743 (753), an optional descrambler 744 (754), a parity check unit 745 (755) and a data sink 746 (756).

The arrangement of FIG. 7 operates as follows. The data sources 710 and 720 both produce data which is meant to be transmitted to the base station subsystem 703. Typical data sources in a mobile terminal subsystem are source data codecs from which there comes e.g. digitally encoded speech to be transmitted to the public land mobile network. The data consists of bits and is arranged into certain discrete units which we may call data blocks. The parity encoding units 711 and 721 calculate a parity code for each block of digital data coming from the data sources 710 and 720 and add the parity codes to the the data blocks. The parity encoded data blocks are then scrambled (or ciphered) scrambling or ciphering units 712 and 722 if scrambling is regarded as necessary; each mobile terminal uses scrambling or ciphering code of its own. The parity encoded and scrambled data blocks are channel encoded in the channel encoders 713 and 723, mapping the bits into symbols and producing code words, and the symbols from several consecutive code words are interleaved in the interleavers 714 and 724.

Figure 8:
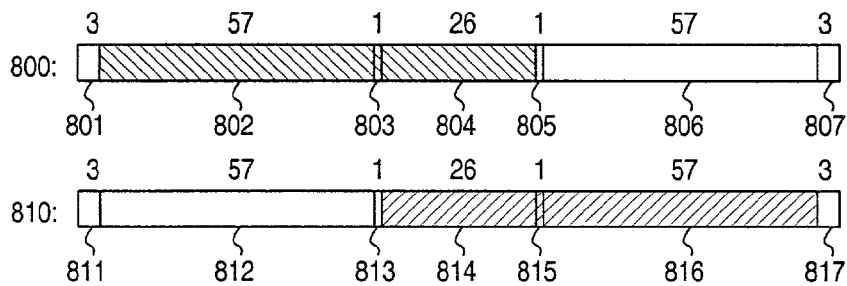
FIG. 8 illustrates exemplary transmission bursts in the arrangement of FIG. 7.

The burst formatting units 715 and 725 take interleaved symbols from the corresponding interleavers 714 and 724 as constituents for digital bursts. In order to preserve compliance with known cellular radio systems, it is again advantageous to apply a known format for the digital bursts in an only slightly modified way. FIG. 8 illustrates an exemplary pair of digital bursts which generally correspond to the known GSM and EDGE specifications. The first digital burst 800 consists, in this order, of three front tail symbols 801, a (first) data field 802 with 57 data symbols, a (first) stealing flag symbol 803, a training sequence 804 with 26 training symbols, a dummy stealing flag symbol 805, a dummy data field 806 with 57 dummy symbols and three back tail symbols 807. The second digital burst 810 consists, in this order, of three front tail symbols 811, a dummy data field 812 with 57 dummy symbols, a dummy stealing flag symbol 813, a training sequence 814 with 26 training symbols, a (second) stealing flag symbol 815, a (second) data field 816 with 57 data symbols and three back tail symbols 817. In other words, the modification with respect to the known GSM and EDGE specifications consists of replacing the second stealing flag symbol and second data field in the first digital burst 800 and the first data field and first stealing flag symbol in the second digital data burst 810 with dummy symbols. Additionally each mobile terminal uses its own training sequence in the fields 804 and 814.

The dummy symbols may be some predefined constant symbols or they may mean instants of no transmission of symbols at all (cf. the tail symbols which mean no transmission of symbols at all). It is probably most advantageous to use the latter alternative, because not transmitting at all for the duration of dummy "symbols" means that less interference is generated and transmission power is not used in vain. Keeping the general interference level low is advantageous because it directly improves the overall achievable capacity of a cellular radio system. Savings in transmission power are especially important in portable radio terminals where they help to extend the interval between two successive battery rechargings. For the sake of consistency we will use, throughout this patent application, the designation "dummy symbols" even in association with those embodiments of the invention where nothing is actually transmitted in place of the dummy fields of a transmission burst.

The association of non-dummy fields with certain connections is emphasized in FIG. 8 by hatching. In the arrangement of FIG. 7 the modulator 716 (726) converts the digital burst into a transmission burst according to known methods, and the transmitter 717 (727) transmits it through the transmitting antenna 718 (728).

When the base station subsystem receives the simultaneously transmitted transmission bursts produced from the digital bursts 800 and 810 through the receiving antenna 730 and receiver 731, it uses the joint channel estimator 732 to obtain channel estimates for the two different training sequences 804 and 814. The invention does not limit the selection of technology for joint channel estimation, but an advantageous method is for example that described in the publication "Co-channel Interference Cancelling Receiver for TDMA Mobile Systems" by P. A Ranta, A. Hottinen and Z.-C. Honkasalo, Proc. ICC'95, pp. 17–21, 1995, which is incorporated herein by reference. When the base station subsystem has obtained a channel estimate for the propagation channels between it and both mobile terminals, it is able to successfully equalize and decode the data fields from both transmission bursts in the parallel equalizers 740 and 750 and parallel decoders 743 and 753. Note that the use of dummy symbols ensures that the base station subsystem does not receive temporally overlapping data symbols.

The reception of consecutive transmission burst pairs in the appropriate time slots and the joint channel estimation and assorting of data symbols into the equalizers 740 and 750 results in data symbols from the first mobile station 701 accumulating into the first deinterleaver 742 and data symbols from the second mobile station 702 accumulating into the second deinterleaver 752. Deinterleaving again inverts the effect of interleaving in both reception subchains, whereafter it is straightforward to perform channel decoding, descrambling (if required) and parity checking in the appropriate functional blocks.

Figure 10:
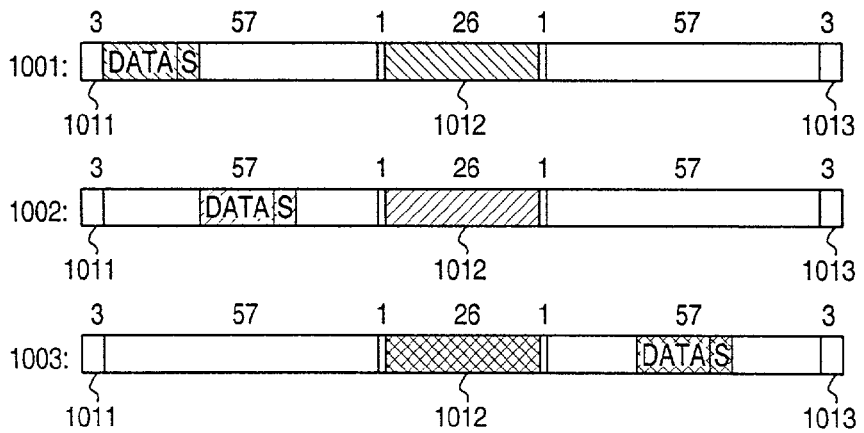
FIG. 10 illustrates exemplary transmission bursts in the arrangement of FIG. 9
Figure 9:
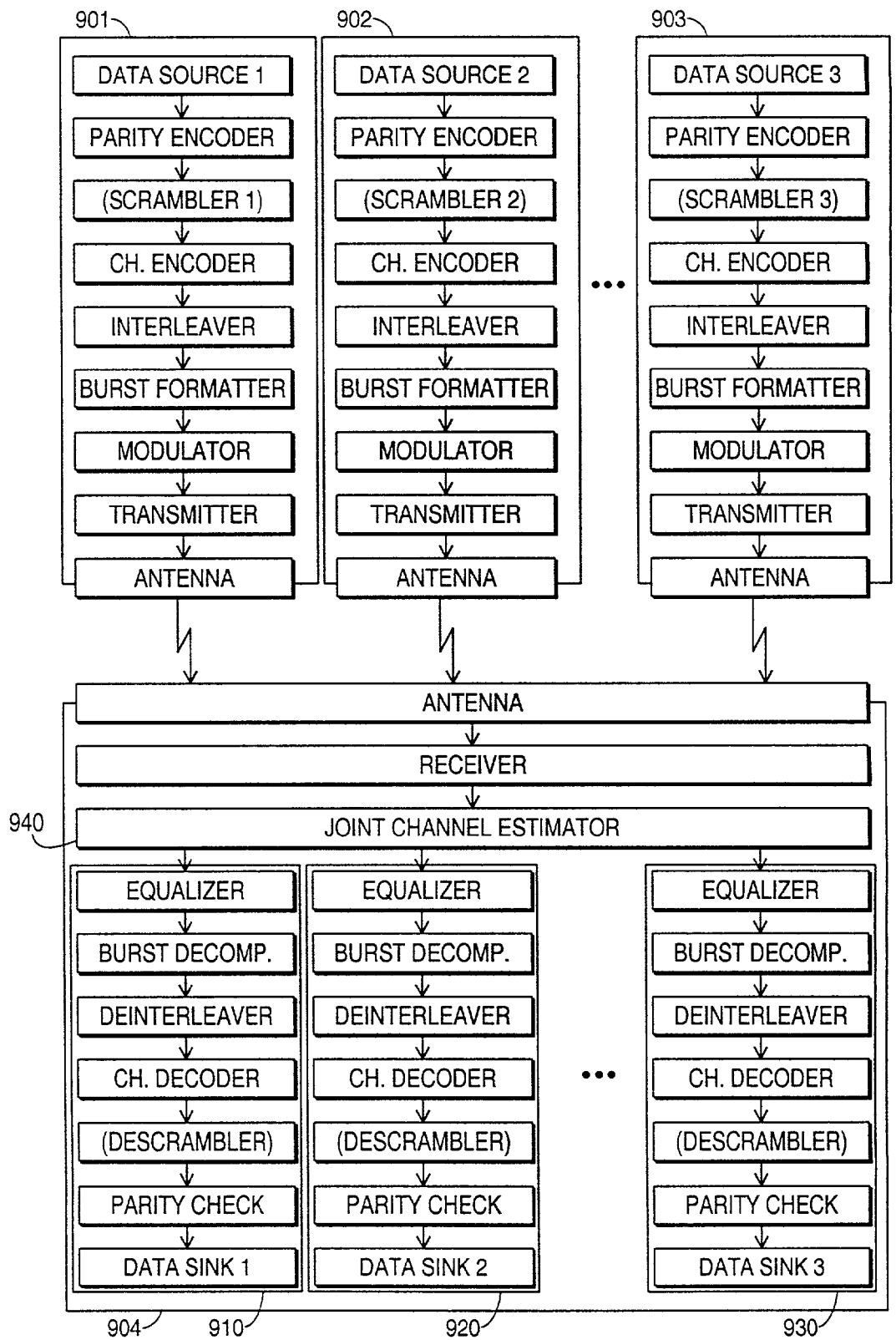
FIG. 9 illustrates a generalization of the arrangement of FIG. 7.

The arrangement of FIG. 7 may be generalized to encompass an arbitrary number of multiplexed communication connections. FIG. 9 illustrates an arrangement where there are a number of parallelly operating mobile terminals, of which terminals 901 to 903 are shown. A base station subsystem 904 comprises a number of parallel reception subchains, of which the reception subchains 910 to 930 are shown. The joint channel estimator 940 serves all reception subchains. FIG. 10 illustrates a number of bursts of which bursts 1001 to 1003 are shown: there are N/2 data fields between the front tail symbols 1011 and the training sequence 1012, and N/2 data fields between the training sequence 1012 and the back tail symbols 1013. Each data field is shown to have its own stealing flag symbol S, and N is an even positive integer. In each frame only one data field, the associated stealing flag symbol and the training sequence are used, and the rest of the data fields and stealing flag symbols are dummy.

Figure 11:
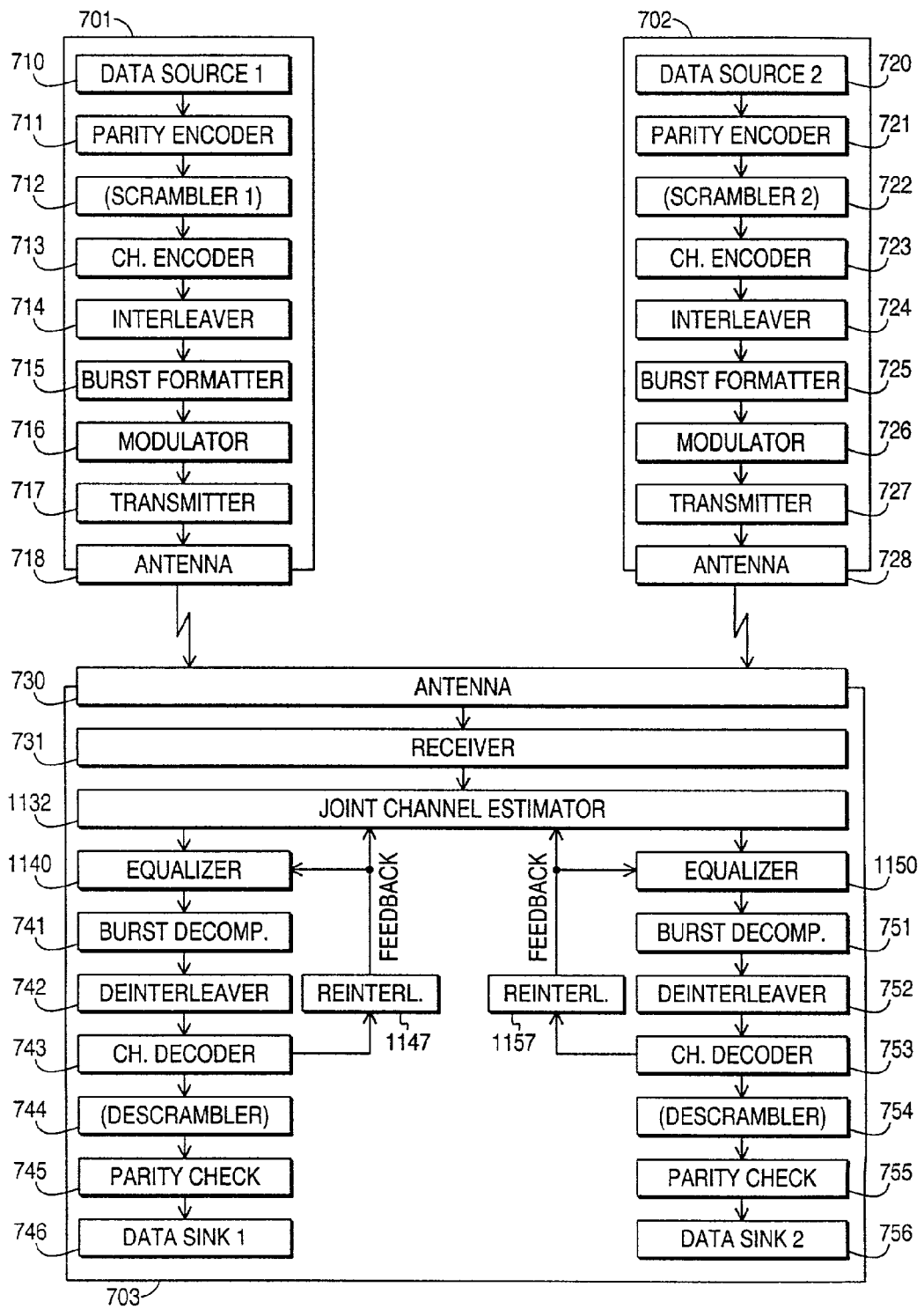
FIG. 11 illustrates a further developed version of the arrangement of FIG. 7.

In a patent application which is filed simultaneously at the priority date of this application by the same applicant there is presented a method and an arrangement for iteratively improving a channel estimate. The solution presented therein is based on iteratively updating the channel estimate with information obtained from channel decoding. Such a solution is especially well suited for improving the joint channel detection performed in the base station subsystem. FIG. 11 illustrates a version of the communication system of FIG. 7 where feedback for iterative channel estimation and equalization is provided through the re-interleaving blocks 1147 and 1157.

The above-described examplary embodiments of the invention should not be construed as placing limitations to the scope of applicability of the appended claims. Especially the certain additional features that are disclosed as further developments of the basic invention are not mutually exclusive but can be combined in a multitude of ways.

The invention claimed is:

1. A method for multiplexing communication connections in a telecommunication system based on time division multiple access, comprising the steps of:

defining a burst structure that consists of symbols and fills a time slot at a radio interface, filling the burst structure with symbols, thus composing a transmission burst, and transmitting the transmission burst with a time slot;

wherein the step of filling the burst structure with symbols comprises the substeps of:
- taking information symbols of a first kind and filling a first part of the burst therewith,
- taking information symbols of a second kind and filling a second part of the burst therewith,
- taking control symbols and filling certain control parts of the burst therewith, wherein in order to separate different downlink transmissions from a base station to mobile stations the method comprises the steps of:
- taking information symbols belonging to a first downlink communication connection between said base station and a mobile station and filling a first data field in the burst therewith,
- taking information symbols belonging to a second downlink communication connection between said base station and a mobile station and filling a second data field in the burst therewith,
- encoding the information symbols belonging to said first downlink communication connection with a first code before filling said first data field in the burst therewith, and
- encoding the information symbols to said second downlink communication connection with a second code, which is different than said first code, before filling said second data field in the burst therewith.

2. A method according to claim 1, additionally comprising the steps of:
- taking a first stealing flag control symbol belonging to said first downlink communication connection and filling a first control field in the burst therewith,
- taking a second stealing flag control symbol belonging to said second downlink communication connection and filling a second control field in the burst therewith, and
- taking a common training sequence consisting of know symbols and filling a training sequence field in the burst therewith.

3. A method according to claim 1, additionally comprising the step of parity encoding the information symbols prior to encoding with either said first code or said second code.

4. A method according to claim 1, additionally comprising the step of parity encoding the information symbols prior to encoding with either said first code or said second code.

5. A method according to claim 1, wherein in order to separate different uplink transmissions from mobile stations to a base station it comprises the steps of:
- taking information symbols belonging to a certain uplink communication connection between a mobile station and said base station and filling a first data field in the burst therewith, and
- taking dummy symbols and filling a second data field in the burst therewith.

6. A method according to claim 5, additionally comprising the steps of:
- taking a first stealing flag control symbol belonging to said uplink communication connection and filling a first control field in the burst therewith,
- taking a dummy stealing flag control symbol and filling a second control field in the burst therewith, and
- taking a training sequence specific to said uplink communication connection and consisting of known symbols, and filling a training sequence field in the burst therewith.

7. A method for separating multiplexed communication connections from each other in a telecommunication system based on time division multiple access, comprising the steps of:
- receiving a signal during a time slot at a radio interface,
- extracting from a first part of said signal a number of information symbols of a first kind,
- extracting from a second part of said signal a number of information symbols of a second kind,
- attempting the decoding of said information symbols of a first kind with a decoding method,
- attempting the decoding of said information symbols of a second kind with the same decoding method, and
- when decoding only one of the information signals of a first kind and information symbols of a second kind with said decoding method was successful, accepting as received those information symbols the decoding of which with said decoding method proved to be successful.

8. A method according to claim 7, comprising the step of parity checking a sequence of information symbols after attempted decoding, so that those information symbols are accepted as received for which no parity errors were found in the parity checking.

9. A method according to claim 7, wherein the step of extracting a number of information symbols of a first kind comprises the step of taking a first temporally separate part of said signal received during a time slot, and the step of extracting a number of information symbols of a second kind comprises the step of taking a second temporally separate part of said signal received during a time slot, and the method additionally comprises the step of performing joint channel estimation for generating at least two mutually different channel estimates, so that each step of attempted decoding is preceded by the equalization of a part of the received signal by using an individual channel estimate.

10. A method according to claim 9, comprising the step of iteratively refining a channel estimate by feeding back to the joint channel estimation step information from the decoded symbols.

11. A transmitter arrangement for maintaining multiplexed communication connections in a telecommunication system based on time division multiple access, comprising:
- a burst formatter arranged to compose a transmission burst that consists of symbols and fills a time slot at a radio interface,
- means for providing the burst formatter with information symbols of a first kind and information symbols of a second kind;

wherein the burst formatter is arranged to fill a first part of a transmission burst with said information symbols of a first kind, a second part of the transmission burst with said information symbols of a second kind and certain control parts of the transmission burst with control symbols, and wherein said means for providing the burst formatter with information symbols of a first kind and information symbols of a second kind comprises an encoder arranged to encode the information symbols of a first kind with a first code and to encode the informtion symbols of a second kind with a second code different than said first code.

12. A transmitter arrangement according to claim 11, wherein said means for providing the burst formatter with information symbols of a first kind comprise a first transmission subchain and said means for providing the burst formatter with information symbols of a second kind comprise a second transmission subchain, so that said information symbols of a first kind belong to a different communication connection than said information symbols of a second kind.

13. A transmitter arrangement according to claim 11, wherein said means for providing the burst formatter with information symbols of a first kind comprise a transmission subchain and said means for providing the burst formatter with information symbols of a second kind comprise means for instructing the burst formatter to use dummy symbols.

14. A receiver arrangement for maintaining multiplexed communication connections in a telecommunication system based on time division multiple access, comprising:
a burst decomposer arranged to decompose a transmission burst that consists of symbols and fills a time slot at a radio interface into sequences of information symbols,
means for separatedly attempting the decoding of different sequences of information symbols extracted from a transmission burst by said burst decomposer with a same decoding method, and
means for accepting as received those information symbols the decoding of which proved to be successful, when decoding only one of the information symbols of a first kind and information symbols of a second kind with said decoding method was successful.

15. A receiver arrangement according to claim 14, comprising a decoder and parity checking means for checking the parity of different sequences of information symbols extracted from a transmission burst by said burst decomposer after decoding.

16. A receiver arrangement according to claim 14, comprising:
means for extracting temporally separate parts from received transmission bursts,
a joint channel estimator arranged to generate at least two mutually different channel estimates, and
signal equalizer means for separately equalizing said extracted temporally separate parts of the received signal by using individual channel estimates.

17. A receiver arrangement according to claim 16, comprising means for feeding back to the joint channel estimator information from decoded symbols, so that the joint channel estimator is arranged to perform iterative channel estimation on the basis of the feedback information.

18. A method for multiplexing communication connections in a telecommunication system based on time division multiple access, comprising the steps of:
defining a burst structure that consists of symbols and fills a time slot at a radio interface,
filling the burst structure with symbols, thus composing a transmission burst, and
transmitting the transmission burst with a time slot;
wherein the step of filling the burst structure with symbols comprises the substeps of:
taking information symbols of a first kind and filling a first part of the burst therewith,
taking information symbols of a second kind and filling a second part of the burst therewith, and
taking control symbols and filling certain control parts of the burst therewith;
wherein in order to separate different downlink transmissions from a base station to mobile stations it further comprises the steps of:
taking information symbols belonging to a first downlink communication connection between said base station and a mobile station and filling a first data field in the burst therewith,
taking information symbols belonging to a second downlink communication connection between said base station and a mobile station and filling a second data field in the burst therewith,
taking a first stealing flag control symbol belonging to said first downlink communication connection and filling a first control field in the burst therewith,
taking a second stealing flag control symbol belonging to said second downlink communication connection and filling a second control field in the burst therewith, and
taking a common training sequence consisting of known symbols and filling a training sequence field in the burst therewith.

19. A method for multiplexing communication connections in a telecommunication system based on time division multiple access, comprising the steps of:
defining a burst structure that consists of symbols and fills a time slot at a radio interface,
filling the burst structure with symbols, thus composing a transmission burst, and
transmitting the transmission burst within a time slot;
wherein the step of filling the burst structure with symbols comprises the substeps of:
taking information symbols of a first kind and filling a first part of the burst therewith,
taking information symbols of a second kind and filling a second part of the burst therewith, and
taking control symbols and filling certain control parts of the burst therewith,
wherein in order to separate different downlink transmissions from a base station to mobile stations it further comprises the steps of:
taking information symbols belonging to a first downlink communication connection between said base station and a mobile station and filling a first data field in the burst therewith,
taking information symbols belonging to a second downlink communication connection between said base station and a mobile station and filling a second data field in the burst therewith,
encoding the information symbols belonging to said first downlink communication connection with a first code before filling said first data field in the burst therewith, and
encoding the information symbols belonging to said second downlink communication connection with a second code, which is different than said first code, before filling said second data field in the burst therewith.

20. A method for multiplexing communication connections in telecommunication system based on time division multiple access, comprising the steps of:
defining a burst structure that consists of symbols and fills a time slot at a radio interface,
filling the burst structure with symbols, thus composing a transmission burst, and
transmitting the transmission burst with a time slot;
wherein the step of filling the burst structure with symbols comprises the substeps of:
taking information symbols of a first kind and filling a first part of the burst therewith,
taking information symbols of a second kind and filling a second part of the burst therewith, and
taking control symbols and filling certain control parts of the burst therewith,
wherein in order to separate different uplink transmissions from mobile stations to a base station it comprises the steps of:

taking information symbols belonging to a certain uplink communication connection between a mobile station and said base station and filling a first data field in the burst therewith, and taking dummy symbols and filling a second data field in the burst therewith.

21. A method according to claim 20, additionally comprising the steps of:

taking a first stealing flag control symbol belonging to said uplink communication connection and filling a first control field in the burst therewith, taking a dummy stealing flag control symbol and filling a second control field in the burst therewith, and taking a training sequence specific to said uplink communication connection and consisting of known symbols, and filling a training sequence field in the burst therewith.

22. A method for separating multiplexed communication connections from each other in a telecommunication system based on time division multiple access, comprising the steps of:

receiving a signal for the whole duration of a time slot at a radio interface, extracting from a first part of a signal received during a time slot a number of information symbols of a first kind, extracting from a second part of said signal received during a time slot a number of information symbols of a second kind, attempting the decoding of said information symbols of a first kind, attempting the decoding of said information symbols of a second kind, and accepting as received those information symbols the decoding of which proved to be successful, parity checking a sequence of information symbols after attempted decoding, so that those information symbols are accepted as received for which no parity errors were found in the parity checking, wherein the step of extracting a number of information symbols of a first kind comprises the step of taking a first temporally separate part of said signal received during a time slot, and the step of extracting a number of information symbols of a second kind comprises the step of taking a second temporally separate part of said signal received during a time slot, and the method additionally comprises the step of performing joint channel estimation for generating at least two mutually different channel estimates, so that each step of attempted decoding is preceded by the equalization of a part of the received signal by using an individual channel estimate.

23. A method according to claim 22, comprising the step of iteratively refining a channel estimate by feeding back to the joint channel estimation step information from the decoded symbols.

24. A transmitter arrangement for maintaining multiplexed communication connections in a telecommunication system based on time division multiple access, comprising:

a burst formatter arranged to compose a transmission burst that consists of symbols and fills a time slot at a radio interface, means for providing the burst formatter with information symbols of a first kind and information symbols of a second kind;

wherein the burst formatter is arranged to fill a first part of a transmission burst with said information symbols of a first kind, a second part of the transmission burst with said information symbols of a second kind and certain control parts of the transmission burst with control symbols, and said means for providing the burst formatter with information symbols of a first kind comprise a first transmission subchain and said means for providing the burst formatter with information symbols of a second kind comprise a second transmission subchain, so that said information symbols of a first kind belong to a different communication connection than said information symbols of a second kind.

25. A receiver arrangement for maintaining multiplexed communication connections in a telecommunication system based on time division multiple access, comprising:

a burst decomposer arranged to decompose a transmission burst that consists of symbols and fills a time slot at a radio interface into sequences of information symbols, means for separatedly attempting the decoding of different sequences of information symbols extracted from a transmission burst by said burst decomposer, means for accepting as received those information symbols the, decoding of which proved to be successful, means for extracting temporally separate parts from received transmission bursts, a joint channel estimator arranged to generate at least two mutually different channel estimates, signal equalizer means for separately equalizing said extracted temporally separate parts of the received signal by using individual channel estimates, and means for feeding back to the joint channel estimator information from decoded symbols, so that the joint channel estimator is arranged to perform iterative channel estimation on the basis of the feedback information.

26. A receiver arrangement according to claim 25, comprising a decoder and parity checking means for checking the parity of different sequences of information symbols extracted from a transmission burst by said burst decomposer after decoding.

* * * * *